B. WOOD.
GRASS DISTRIBUTER FOR MOWING MACHINES.
APPLICATION FILED MAY 29, 1914.
1,113,853.
Patented Oct. 13, 1914.
2 SHEETS—SHEET 2.
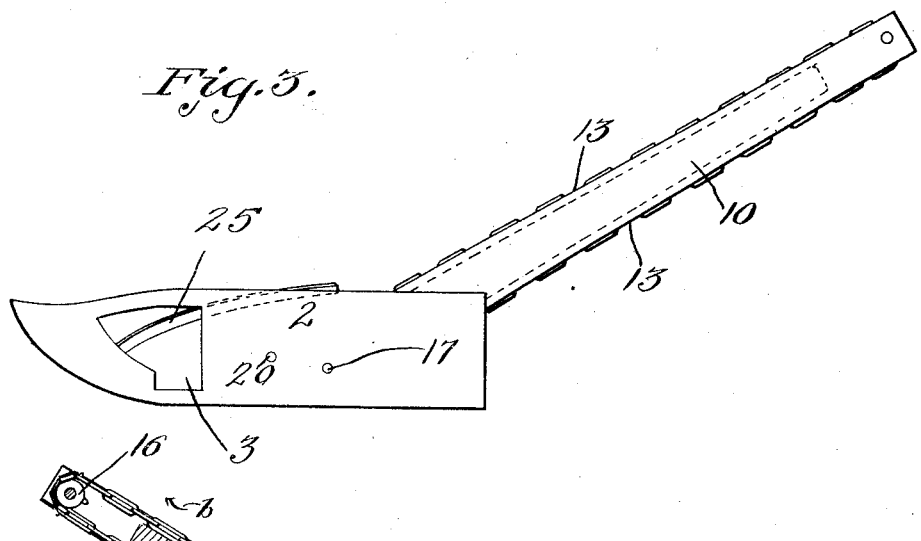
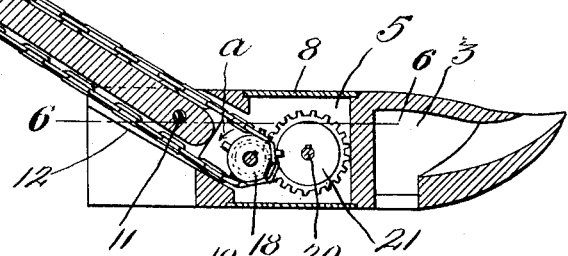
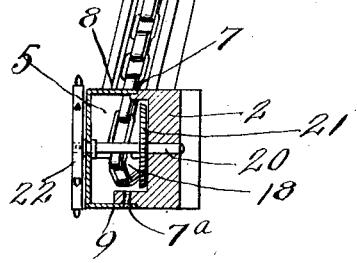
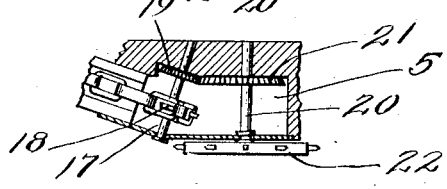
Witnesses
Philip Terrell
Francis G. Boswell
Inventor
Bert Wood
By D. Swift & Co.
his Attorneys
THE NORRIS PETERS CO., PHOTO-LITHO., WASHINGTON, D. C.

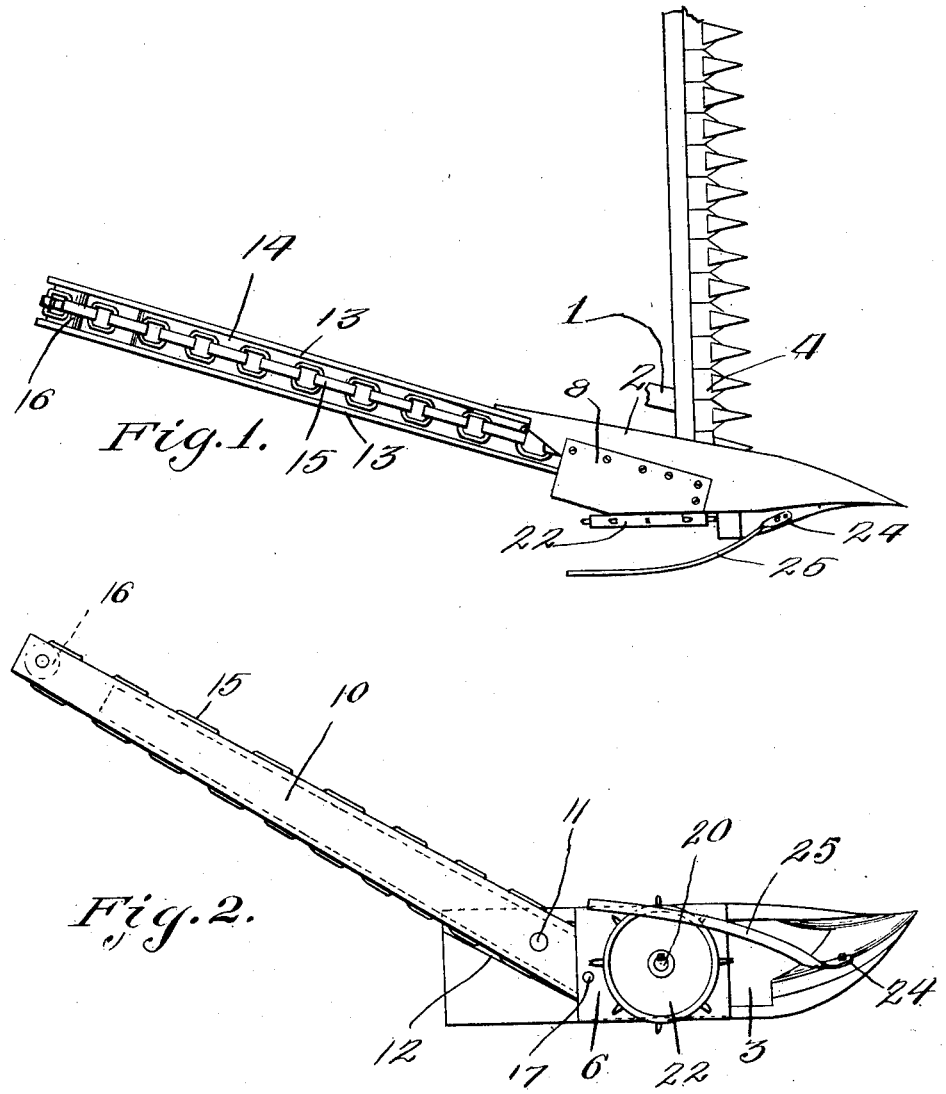

UNITED STATES PATENT OFFICE.

BERT WOOD, OF VERNONIA, OREGON.

GRASS-DISTRIBUTER FOR MOWING-MACHINES.

1,113,853.          Specification of Letters Patent.      Patented Oct. 13, 1914.

Application filed May 29, 1914. Serial No. 841,840.

*To all whom it may concern:*

Be it known that I, BERT WOOD, a citizen of the United States, residing at Vernonia, in the county of Columbia and State of Oregon, have invented a new and useful Grass-Distributer for Mowing-Machines; and I do hereby declare the following to be a full, clear, and exact description of the invention, such as will enable others skilled in the art to which it appertains to make and use the same.

This invention relates to the art of mowing machines, and particularly to a useful improved distributer, an object of which is to attach the same to one of the shoes of the mowing machine, so as to equally distribute the grass as it is cut in the rear of the machine.

Heretofore, it has been found necessary to provide an attendant to follow the mowing machine using a fork in any suitable manner to keep the grass from gathering in bunches. Therefore, another object of the invention is to provide this improved grass spreader, including a conveyer for conveying the grass upwardly and rearwardly of the machine upon the grass stick or guard, and as the grass falls in the rear, it will be equally and evenly distributed upon the ground.

Another object of the invention is to provide guard means, to prevent the grass from becoming entangled with the operating wheel, which automatically operates the conveyer by engagement with the ground or soil.

In practical fields the details of construction may necessitate alterations, falling within the scope of what is claimed.

The invention comprises further features and combination of parts, as hereinafter set forth, shown in the drawings and claimed.

In the drawings:—Figure 1 is a view showing the improved spreader or distributer to be applied to a mowing machine. Fig. 2 is a side elevation of the distributer detached. Fig. 3 is a view in elevation showing the opposite side of the distributer. Fig. 4 is a longitudinal sectional view. Fig. 5 is a transverse sectional view through the forward portion of the distributer. Fig. 6 is a sectional view on line 6—6 of Fig. 4.

Referring to the drawings, 1 designates the portion of the usual mowing machine having the conventional form of shoe 2, through an opening 3 of which the sickle bar 4 is designed to reciprocate. One side of the shoe is provided with a recess 5, over which a plate or shield 6 is arranged, thereby providing an inclosure. This plate or shield 6 is substantially trough or U-shaped and is provided with upper and lower flanges 8 and 9. The upper flange 8 is secured in any suitable manner, as shown at 7 to the upper face of the shoe. The lower flange 9 of the shield is secured by a screw 7ª to the lower face of the shoe. However, the upper flange may also be secured by a screw if desired.

Partially pivoted in the rear portion of the recess 5, is what, in the present instance, may be termed a grass guard stick 10, the pivot of which is designated by the numeral 11. The rear portion of the recess 5 has a rearwardly and upwardly inclined shoulder 12, on which the grass guide or guard stick 10 engages to support the same, that is, act as an abutment shoulder. The shoulder 12 is to one side of the guard stick 10, so that the chain will not bind on the shoulder and retard the chain in its movement. The upper and lower faces of the grass guide or guard stick have longitudinal side flanges 13, between which a gutter or trough 14 is formed, and in which trough or gutter between said flanges a conveyer chain 15 travels, the same passing over a sprocket 16 journaled in bearings of the rear upper end of the grass guide stick. Journaled in the plate 6 and in the shoe is a shaft 17 (which is disposed slightly on an angle as shown in Fig. 6) provided with a sprocket wheel 18 and a gear wheel 19. The conveyer chain passes over the sprocket wheel 18, as shown. A second shaft 20 is journaled in the plate 6 and the shoe, and on one end of this shaft 20 a gear 21 is mounted, meshing with the gear 19, whereas upon the other end of the shaft 20 a traction wheel 22 is mounted to move with the shaft. As the wheel 22 engages the ground or soil, motion is imparted to the shaft 20 and through the medium of the intermeshing gears, motion in the direction of the arrow *a* is imparted to the sprocket wheel 18, which causes the conveyer chain to move in the direction of the arrow *b*, which will convey the grass upwardly and rearwardly, and as it leaves the upper rear end of the grass guide stick, it is equally distributed, thereby obviating the necessity of an attendant walking in the rear of the mower, using a fork to prevent the grass from being distributed in bunches.

Secured at 24 to one side of the shoe adjacent its forward end is a guard 25, extending rearwardly to guard the traction wheel and prevent grass from becoming entangled therewith.

The invention having been set forth, what is claimed as new and useful is:—

1. In combination with a mowing machine shoe having an inclosure and provided with a recess on one side, a grass guide stick pivoted in said recess and provided with a conveyer chain operating thereon and parallel therewith, and means for automatically operating the chain.

2. In combination with a mowing machine shoe having an inclosure and provided with a recess on one side, a grass guide stick pivoted in said recess and provided with a conveyer chain operating thereon and parallel therewith, and means for automatically operating the chain, the rear portion of said recess being constructed with means to support the stick.

3. In combination with a mowing machine shoe having an elongated recess on one side, a plate secured to the shoe and arching over the recess thereby forming an inclosure or housing, a sprocket wheel mounted in bearings of the housing, a shaft mounted in said housing having a traction wheel and provided with gear connections to said sprocket to impart motion thereto, a grass guide stick arranged in the said recess to have a partial pivotal movement, the upper and lower faces of said stick having guide flanges, a sprocket wheel mounted in the upper rear end of the stick, a conveyer chain traveling over both of said sprockets, said recess having an abutment shoulder inclined upwardly and rearwardly to support the stick.

In testimony whereof I have signed my name to this specification in the presence of two subscribing witnesses.

BERT WOOD.

Witnesses:
 IRENE SPENCER,
 S. A. SPENCER.

---

Copies of this patent may be obtained for five cents each, by addressing the "Commissioner of Patents, Washington, D. C."